United States Patent [19]

Nishimura et al.

[11] Patent Number: 5,542,456
[45] Date of Patent: Aug. 6, 1996

[54] COIL WIRE HANDLING APPARATUS

[75] Inventors: Masaaki Nishimura, Hadano; Masatoshi Hirano, Odawara; Mitsuhiro Harada, Hadano, all of Japan

[73] Assignee: Odawara Engineering Co., Ltd., Kanagawa, Japan

[21] Appl. No.: 280,602

[22] Filed: Jul. 26, 1994

[51] Int. Cl.$^6$ ................................................. H02K 15/06
[52] U.S. Cl. ........................................... 140/92.1; 29/732
[58] Field of Search ............................... 140/92.1; 29/732, 29/734

[56] References Cited

U.S. PATENT DOCUMENTS

| | | | |
|---|---|---|---|
| 3,129,499 | 4/1961 | Greene | 29/205 |
| 3,407,490 | 10/1968 | Gibbs | 29/732 |
| 3,677,480 | 7/1972 | Schanke | 242/1.1 R |
| 3,785,212 | 1/1974 | Eminger | 74/23 |
| 3,822,830 | 7/1974 | Peters | 242/1.1 R |
| 4,299,023 | 11/1981 | Tanaka et al. | 29/734 |
| 4,723,354 | 2/1988 | Moser | 29/732 |
| 4,858,835 | 8/1989 | Luciani et al. | 242/1.1 A |
| 4,991,782 | 2/1991 | Luciani | 242/1.1 OR |
| 5,099,568 | 3/1992 | Santandrea | 29/732 |
| 5,186,405 | 2/1993 | Beakes et al. | 242/1.1 OR |
| 5,237,740 | 8/1993 | Hayashi et al. | 29/734 |

*Primary Examiner*—Lowell A. Larson
*Attorney, Agent, or Firm*—Thompson, Hine & Flory P.L.L.

[57] ABSTRACT

An inserter tool comprising a plurality of blades extending longitudinally from a platform spaced apart from one another so as to provide a plurality of guides between adjacent blades, and being arranged to receive a wound wire coil stripped from a winding form. A pair of wire holders on the platform for holding the leading end and trailing end of the wire forming the coil, and being capable of extending from a first position adjacent the platform to a second position removed from the platform.

19 Claims, 8 Drawing Sheets

COIL WIRE HANDLING APPARATUS

BACKGROUND OF THE INVENTION

The present invention relates to a wire handling apparatus for motor coils, which, at specified positions, holds or connects the start and the finish lead wires of coils inserted into the stator core of an electric motor.

In the prior art, coils are wound by a coil winding device and dropped in between the blades of a coil inserter upper tool. The coils are then inserted into slots of the stator core by a coil insertion device. Workers manually connect the start and the finish lead wires of the coils to an appointed position on the stator core or an exclusive lead wire handling fixture is employed. However, this conventional method requires excessive time and results in a high production cost. Furthermore, the location and configuration of the lead wires of wound coils are not usually aligned after they are inserted in the stator slots, and workers sometimes have trouble finding them hidden inside the stator core. Therefore, other problems arise such as decreased productivity with manual work and no opportunity to automate processes after coil insertion.

The present invention has been developed in view of the above problems, and it is therefore an object of the invention to automate the handling of lead wires subsequent to the insertion of coils.

SUMMARY OF THE INVENTION

This invention provides a handling apparatus for a lead wire of motor coils which is useful during winding and coil insertion operation, wherein wire supplied through a rotating flier is wound by consecutive turns on a winding form which has either single or plural stages, the wound coils on each stage are stripped from the winder and inserted in between the blades of the inserter upper tool. The inserter upper tool is conventional, consists of a number of blades and guides, and is provided under the winding form. The coils dropped in between the blades of the inserter upper tool are inserted into slots of a stator core, which is fixed on a pallet, and transferred on the pallet to the coil insertion station. The apparatus includes a rotating flier; a winding form about which the flier winds the coils by consecutive turns; an insertion tool onto which the coils are stripped; first lead wire holders, which can hold the leading end and the trailing end of the lead wire, installed on the inserter upper tool; second lead wire holders, which can hold the leading end and the trailing end of the lead wire, installed on the pallet at a position corresponding to the first lead wire holders; a first lead wire transfer means which grasps the wire on the winding form and transfers the wire to the first lead wire holders; and a second lead wire transfer means for transferring the lead wires held by the first lead wire holders to the second lead wire holders.

As a second embodiment, the invention provides a lead wire handling and terminating apparatus which includes a rotating flier; a winding form about which the flier winds the coils by consecutive turns; an insertion tool onto which the coils are stripped; lead wire holders, which can hold the leading end and trailing end of the lead wire, installed at specified positions on the inserter upper tool; connecting terminals, which can connect the leading end and trailing end of the lead wire, installed at specified positions on the stator core corresponding to the lead wire holder; a first lead wire transfer means which grasps the wire on the winding form and transfers the wire to the first lead wire holders; and a second lead wire transfer means for transferring lead wires held in the lead wire holders to the connecting terminals.

As a third embodiment, the invention provides a lead wire handling apparatus which includes a rotating flier; a winding form about which the flier winds the coils by consecutive turns; an insertion tool onto which the coils are stripped; first lead wire holders, which can hold the leading end and the trailing end of the lead wire and extend in the direction of coil insertion, located at a specified position on the inserter upper tool; second lead wire holders, which can hold the leading end and the trailing end of the lead wire, installed on a pallet in a position corresponding to the first lead wire holders; a lead wire transfer means for grasping the lead wires held in the first lead wire holders; and a holder drive means for extending the first lead wire holders in the direction of the second lead wire holders.

As a fourth embodiment, the invention provides a lead wire apparatus which includes a rotary flier; a winding form about which the flier winds the coils by consecutive turns; an insertion tool onto which the coils are stripped; first lead wire holders, which can hold the leading end and the trailing end of the lead wire and are flexible to extend in the direction of insertion of the coils, installed at specified positions on the upper tool; connecting terminals, which can connect the leading end and the trailing end of the lead wire, installed on the stator core in a position corresponding to the lead wire holders; a lead wire transfer means for holding the lead wires in the lead wire holders; and a holder drive means for extending the lead wire holders in the direction of the connecting terminals.

The invention also provides an inserter tool comprising a plurality of blades extending longitudinally from a platform, the blades being spaced from one another so as to provide a plurality of guides between the adjacent blades, said blades and guides being arranged to receive a wound wire coil stripped from a winding form, and a pair of wire holders on the platform for holding the leading end and the trailing end of the wire forming the coil.

The various embodiments of the lead wire treating apparatus according to the present invention are composed as described above. The lead end of coils wound on the winding form by rotation of a flier is transferred by the first lead wire transfer means so as to be held by the lead wire holder on the inserter upper tool when the coils are wound and stripped down in between the blades of the inserter upper tool. The trailing end of the lead wire is transferred by means of the same or the other first lead wire transfer means so as to be held by the other lead wire holder on the inserter upper tool when all of the coils are wound and stripped down in between the blades of the inserter upper tool.

Next, the inserter upper tool moves from the winding station to an insertion station. The stator core, which is fixed on a pallet, is transferred on the pallet to the insertion station and comes to a stop. As the pallet stops, the stator core engages the inserter upper tool. The coils dropped into the inserter upper tool are driven upward and inserted into specified slots of the stator core. At the same time, the lead wires held in the lead wire holders on the inserter upper tool are transferred so as to be held by the lead wire holders on the pallet or connected to the terminals on the stator core by means of second lead wire transfer means or the holder drive means.

DETAILED DESCRIPTION OF THE INVENTION

Figure 2:
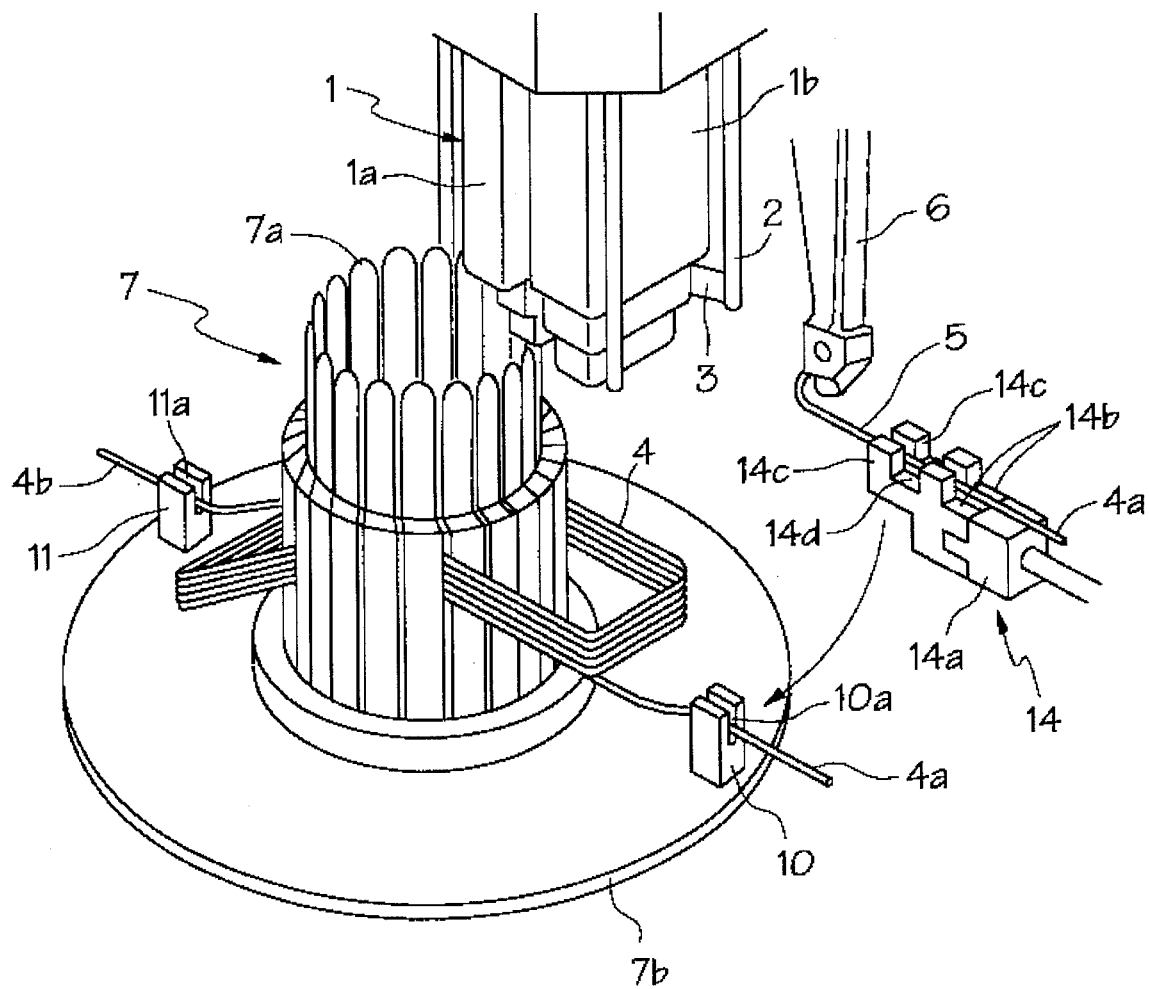
FIG. 2 is a perspective view showing the upper tool side of the first embodiment viewed from diagonally upward.

A coil winding device at the winding station, as shown in FIG. 2, is provided with a winding form 1 consisting of a fixed half 1a and a movable half 1b. The space between the fixed half 1a and the movable half 1b is adjustable. The respective halves of winding form 1a and 1b are movable vertically and have either a single or plural stages, in which case the diameter of form 1 increases upwardly by steps. While the invention will be described with reference to a shed winder, those skilled in the art will appreciate that the invention can be used with any winder employing an insertion tool. If a shed winding method is employed, four pushing rods 2 are vertically slidable and provided outside the corners of each half 1a and 1b of the winding form. Pushing plates 3, which are movable vertically in the clearance provided in the winding form 1, are radially fixed at the lower part of the respective pushing rods 2. The pushing rods 2 move downward to cause the pushing plates 3 to strip coils 4 wound on the winding form 1 downward.

A flier 6, through which a coil forming wire 5 which forms coils passes, is rotatably provided outside the above members. As the flier 6 rotates, the winding form 1 moves downward to form winding stages and the wire 5 is simultaneously wound on each of the winding stages of the winding form 1, thereby forming the coils 4.

Figure 3:
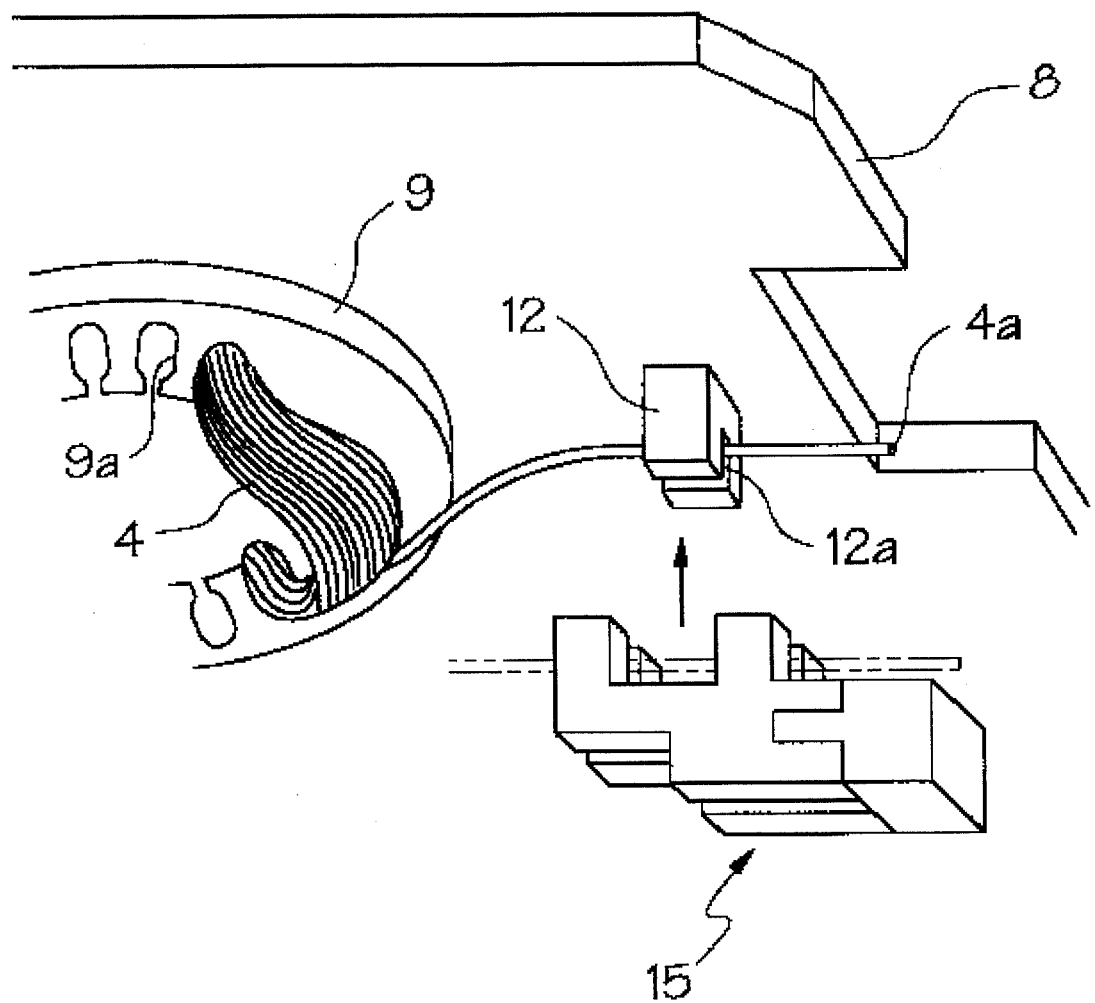
FIG. 3 is a perspective view showing the pallet side of the first embodiment viewed from diagonally downward.

An upper tool 7, which is a coil insertion fixture and has a plurality of blades 7a and is located under the winding form 1. The upper tool 7 receives, in the guides, the coils 4, which have been wound on the winding form 1 and stripped downwards by the pushing plates 3, and moves to the insertion station by means of a turntable. As shown in FIG. 3, the coils 4 are inserted into appointed slots 9a on the stator core 9, which is fixed on the pallet 8 and transferred to the insertion station. At the insertion station, the stator core 9 is positioned in the inserter upper tool 7 by an upward movement of a coil stripper, not shown, in the upper tool 7. This method of coil insertion is conventional and described in more detail in Japanese Patent Publications No. Sho-62-2834 and No. Hei-1-27464. Because this process is well known to those skilled in the art, it will not be described herein in detail.

The first lead wire holders 10 and 11, which are provided with slits 10a and 11a and which can hold the leading end 4a and the trailing end 4b of the coils 4, are arranged on a base plate 7b nearly on opposite sides of the center of the upper tool 7. The second lead wire holders 12 and 13, having similar slits 12a and 13a, are provided on the lower surface of the pallet 8 located above the first lead wire holders 10 and 11, respectively. In order to simplify the view, only one of them is of the first lead wire holders is shown in FIG. 3.

As shown in FIG. 2, in order to snip and hold the leading end 4a of the coils 4 formed with a wire 5 supplied from the flier 6, a pneumatically operated gripper 14 having a pair of arms 14 which are openably and closably journaled by axles 14b on the base plate 14a is provided at the winding station. Arm portion 14c includes a recess 14d which is larger than that of the first lead wire holders 10 and 11. The movement of arms 14c is controlled by a conventional control mechanism, not shown.

Figure 1:
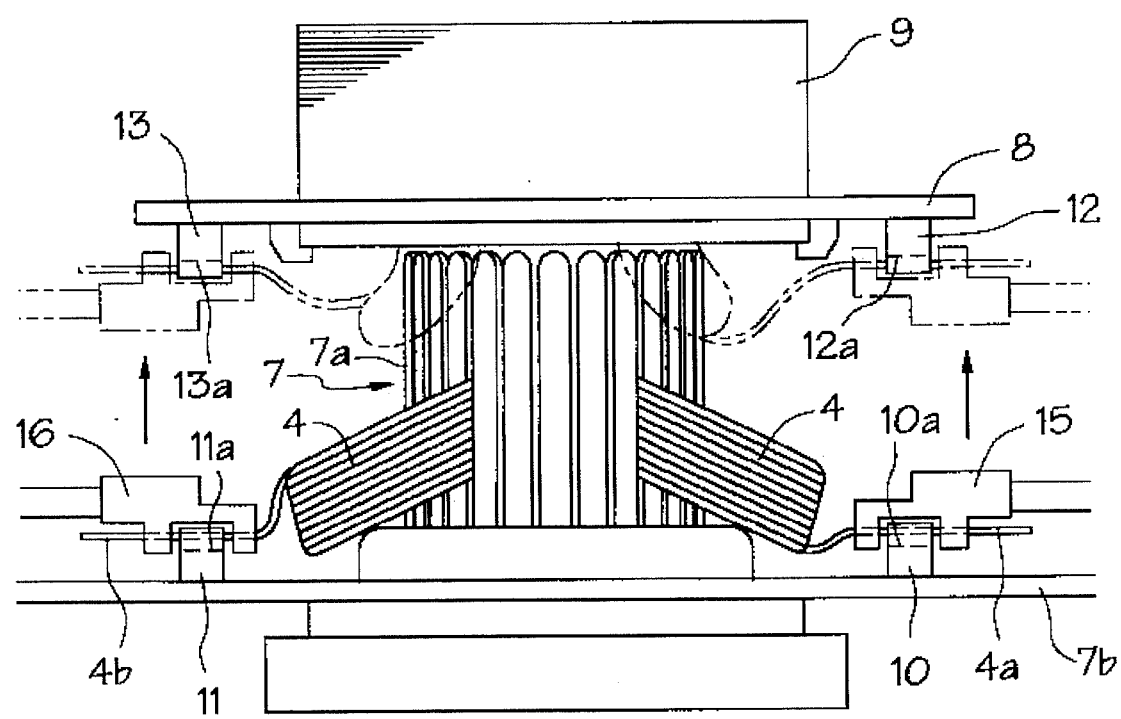
FIG. 1 is a front elevational view showing the first embodiment of the invention.

As shown in FIG. 1, a pair of pneumatic grippers, 15 and 16, is provided at the insertion station. These grippers 15 and 16 transfer the leading end and the trailing end, 4a and 4b, of the coils held by the first lead wire holders 10 and 11 at the upper tool 7 to the second lead wire holders 12 and 13 on the pallet, thereby forming the second lead wire transfer means. Grippers 15 and 16 are also controlled by a conventional control mechanism, not shown. Wire holders 10–13 may each include a pair of fingers which are spring-biased into a closed position in which they grip the wire. To open the fingers, a tapered pin may be inserted into a space between the fingers thereby prying the fingers into an open position in which they can either release or receive the wire.

After the end of the leading end 4a of the coil 4 of a wire 5 supplied from the flier 6 is snipped and held by the gripper 14, the winding form 1 is lowered until the extreme lower part of the movable side of the former slightly engages the upper part of the inserter upper tool 7. The flier 6 is then rotated causing the wire 5 to be wound on the lowest winding stage of the winding form, thereby forming first stage of a coil.

The pushing rods 2 and the pushing plates 3 are lowered and raised simultaneously to cause the coils 4 wound on the winding form 1 to move downward and to be inserted between the blades 7a of the inserter upper tool 7. As the coils 4 are inserted into tool 7, the gripper 14 is rotated about its lengthwise axis and the recess 14d is positioned over the first lead wire holder 10. The leading end 4a held by the gripper 14 is then inserted and held in the slit 10a of the first lead wire holder 10. The gripper 14 is opened to release the lead wire 4a and returns to its original position.

As preset turns of winding are completed at the first winding stage, the winding form 1 is lowered by one step and the second winding stage is presented at the winding position. The wire at the end of the first stage coil is led onto the second winding stage where the second stage of coil is wound, and the coils of this second stage are forced into the upper tool 7. Similarly, the coils after the third stage will be wound, and these coils are also forced into the upper tool 7.

After a predetermined number of coils on each winding stage have been wound, the pushing rods 2 are lowered to the lowest position. Any turns of coils which are left on each stage are pressed downward by the pushing plates 3 into the inserter upper tool 7, thereby completing the coil winding for the first pole.

Next, the wire which forms the trailing end of the first pole is held by a conventional interpole lead wire treating means, not shown, and the inserter upper tool 7 is rotated a preset number of degrees, depending upon the number of poles of the particular motor being wound, so that the coil winding for the next pole can be carried out. As the winding is completed, the end of the wire 5 is held by the same (or a separate) gripper 14, and thereafter, is cut to an appropriate length to make it a trailing end 4b of the lead wire. In FIGS.

1–3, the illustrated motor has two poles. The gripper 14 which holds the trailing end 4b of the lead wire moves as it is rotated, so that the recess 14d can be positioned directly over the first lead wire holder 11 and the trailing end 4b can be inserted into the slit 11a from above. After that, the gripper 14 is opened to release the lead wire 14 and the gripper 14 returns to its original position.

Upon completion of the winding, the inserter upper tool 7 moves from the winding station to the coil insertion station. The stator core 9, which is fixed on the pallet 8, is transferred to the coil insertion station on the pallet and comes to a stop above the upper tool 7. As the pallet 8 stops above the upper tool 7 and is lowered onto the blades of the inserter upper tool 7, as shown in FIG. 1, a pair of second grippers 15 and 16 move into position so as to be positioned directly over the first lead wire holders 10 and 11 and grasp the leading end and the trailing end of the lead wire 4a and 4b, respectively.

A coil stripper, not shown, which moves vertically inside the cylindrically arranged blades 7a is driven upward to insert the coils 4 dropped in the upper tool 7 in appointed slots 9a of the stator core 9. In line therewith, the second grippers 15 and 16 are elevated and rotated to be positioned directly under the second lead wire holders 12 and 13, which are fixed on the lower surface of the pallet 8. The leading end and trailing end of the lead wire, 4a and 4b, are inserted and held in the slits 12a and 13a of the holders. The second grippers 15 and 16 are then opened to release the ends 4a and 4b and returned to their original positions.

In a separate process downstream, connecting terminals are attached to the stator core and the leading end and the trailing end, 4a and 4b, held by the second lead wire holders 12 and 13 on the pallet face are transferred by a similar method using similar pneumatic grippers to the connecting terminals attached on the stator core.

Figure 4:
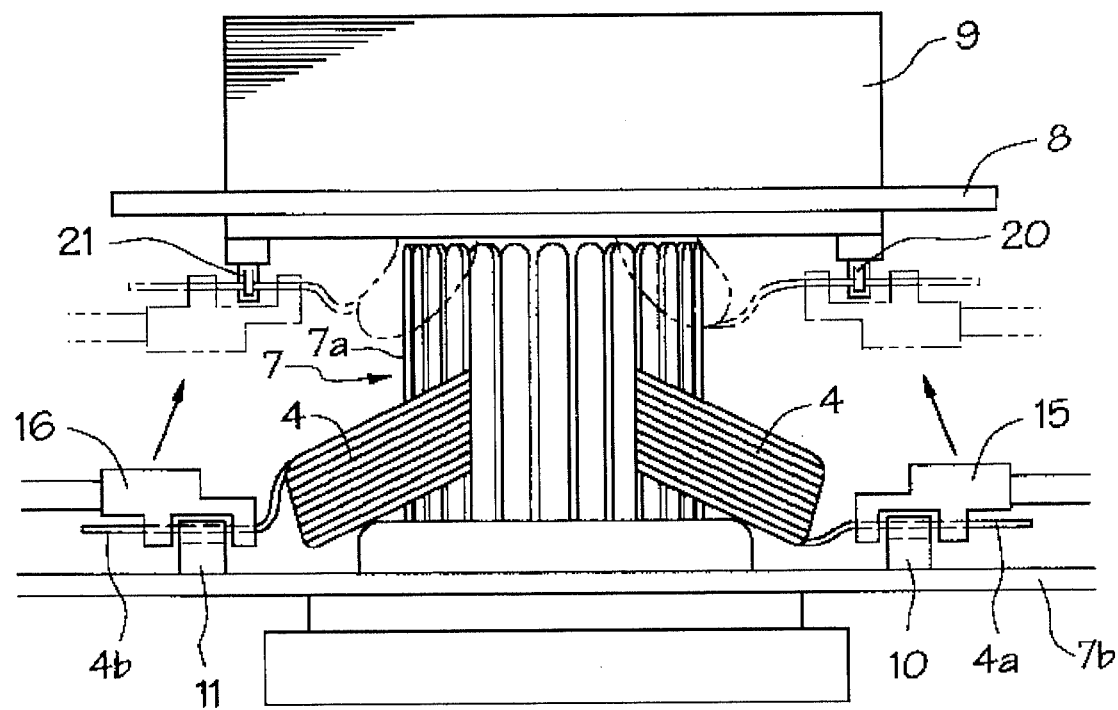
FIG. 4 is a front elevational view of the second embodiment of the invention.
Figure 5:
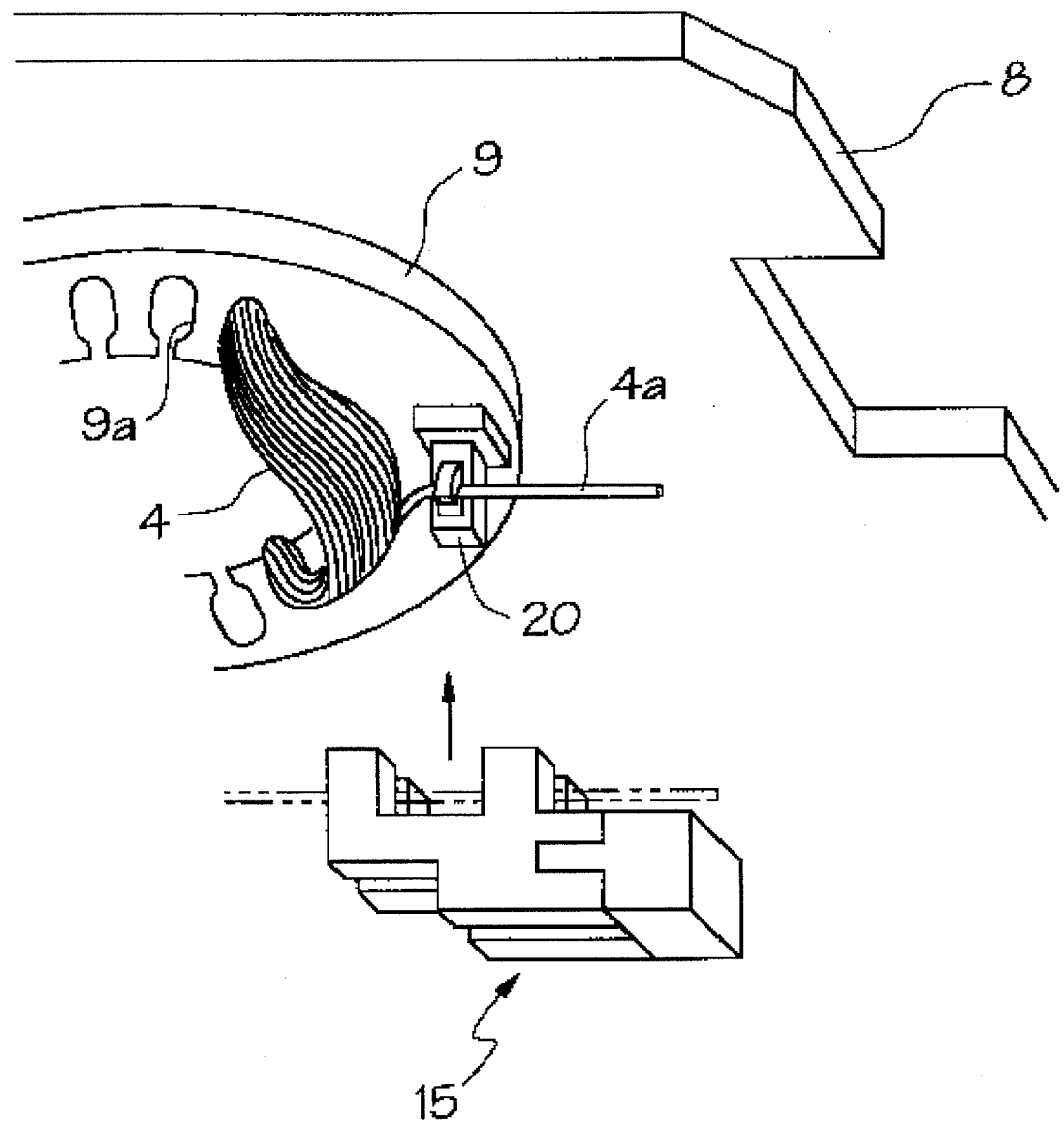
FIG. 5 is a perspective view showing the pallet side of the second embodiment viewed from diagonally downward.

FIG. 4 presents a front elevational view showing the second preferred embodiment of the present invention in which the connecting terminals are pre-attached to the stator core. FIG. 5 is a perspective view of the pallet for the second preferred embodiment viewed from diagonally downward and the wires are transferred to the terminals by the pneumatic grippers 15 and 16. In FIGS. 4 and 5, the parts which are identical to those in the first preferred embodiment have the same reference numbers and their description has been omitted.

The second embodiment differs from the first embodiment in that the second lead wire holders 12 and 13 installed at the pallet 8 in the first preferred embodiment are installed at the stator core 9 as connecting terminals 20 and 21. Conventionally, these terminals include a small projection which is crimped around the wire to hold the wire in the connecting terminals 20 and 21. All of the other parts of this second embodiment are identical to those in the first embodiment.

Furthermore, the leading end and the trailing end of the lead wire, 4a and 4b, of the coils dropped in the upper tool 7 after the winding is finished are held by the first lead wire holders 10 and 11 studded on the base plate 7b at the inserter upper tool. The inserter upper tool 7 moves to the insertion station, where the grippers 15 and 16 overlap above the first lead wire holders 10 and 11 and hold the ends 4a and 4b. The processes of the first and second embodiments are identical up to this point.

Next, in line with the coils 4 being inserted into the slots 9a of the stator core as the coil stripper inside the upper tool is elevated, the second grippers 15 and 16 move diagonally upward as being upturned and overlap the connecting terminals 20 and 21 from below connecting the leading end 4a and the trailing end 4b to the connecting terminals 20 and 21. Upon completion of the connection, the grippers 15 are opened to release lead wires and return to their original positions.

With this second embodiment, it is possible to connect the leading end and the trailing end, 4a and 4b, directly to the connecting terminals on the stator core 9 without second lead wire holders installed on the pallet, thus reducing the number of work steps and increasing productivity.

Figure 6:
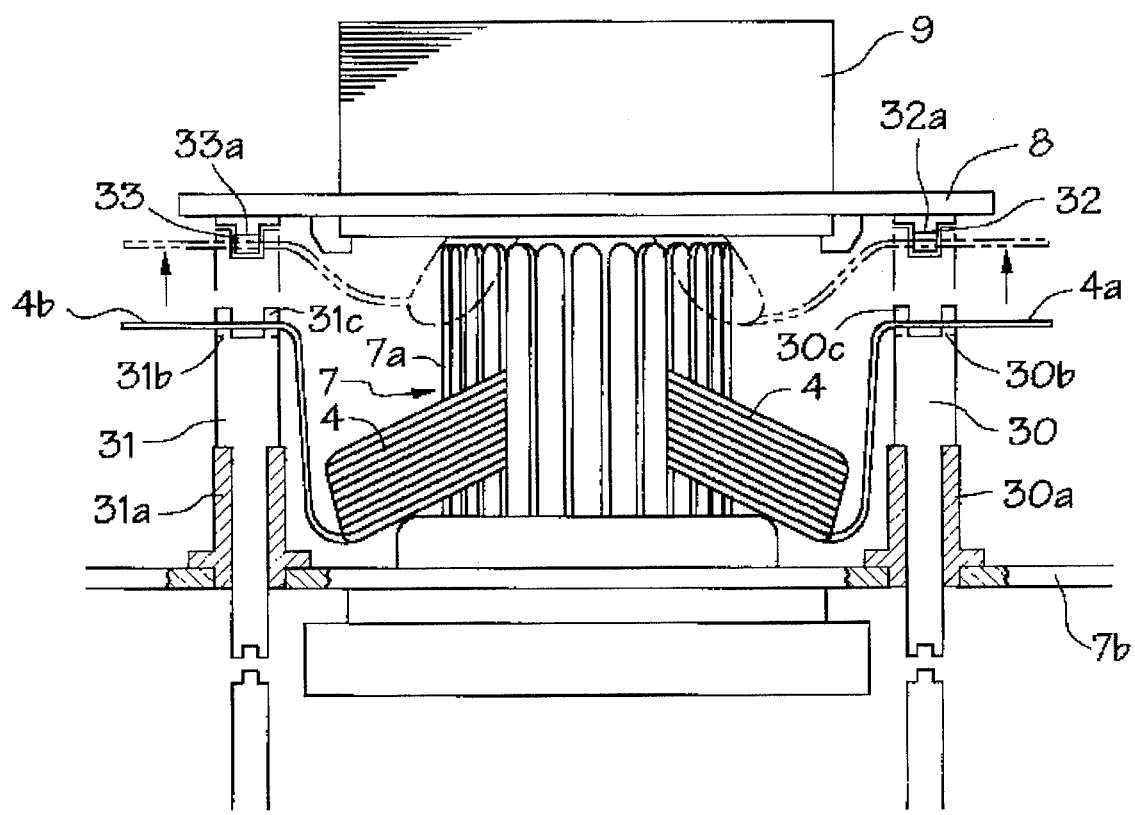
FIG. 6 is a front elevational view showing the third embodiment of the invention.
Figure 7:
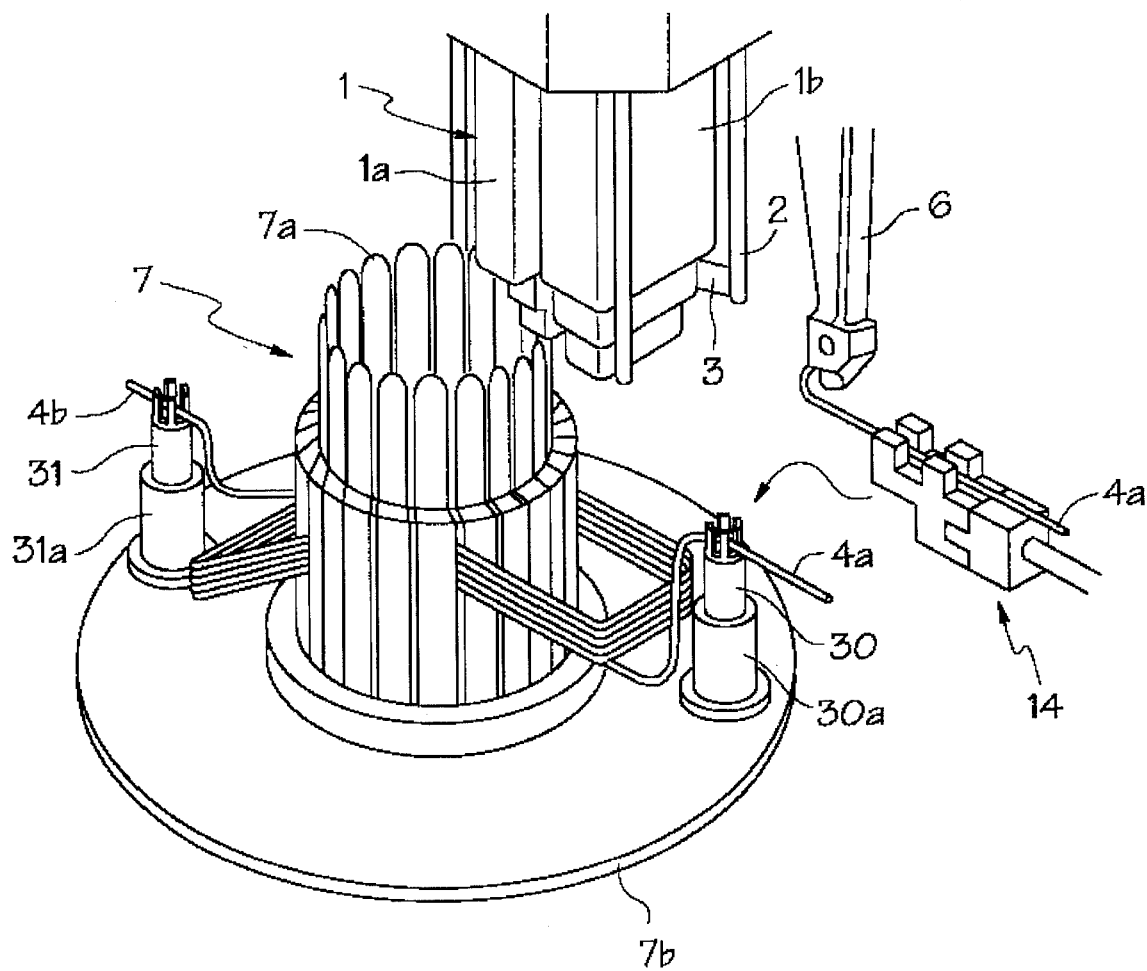
FIG. 7 is a perspective view showing the upper tool side of the third embodiment viewed from diagonally upward.
Figure 8:
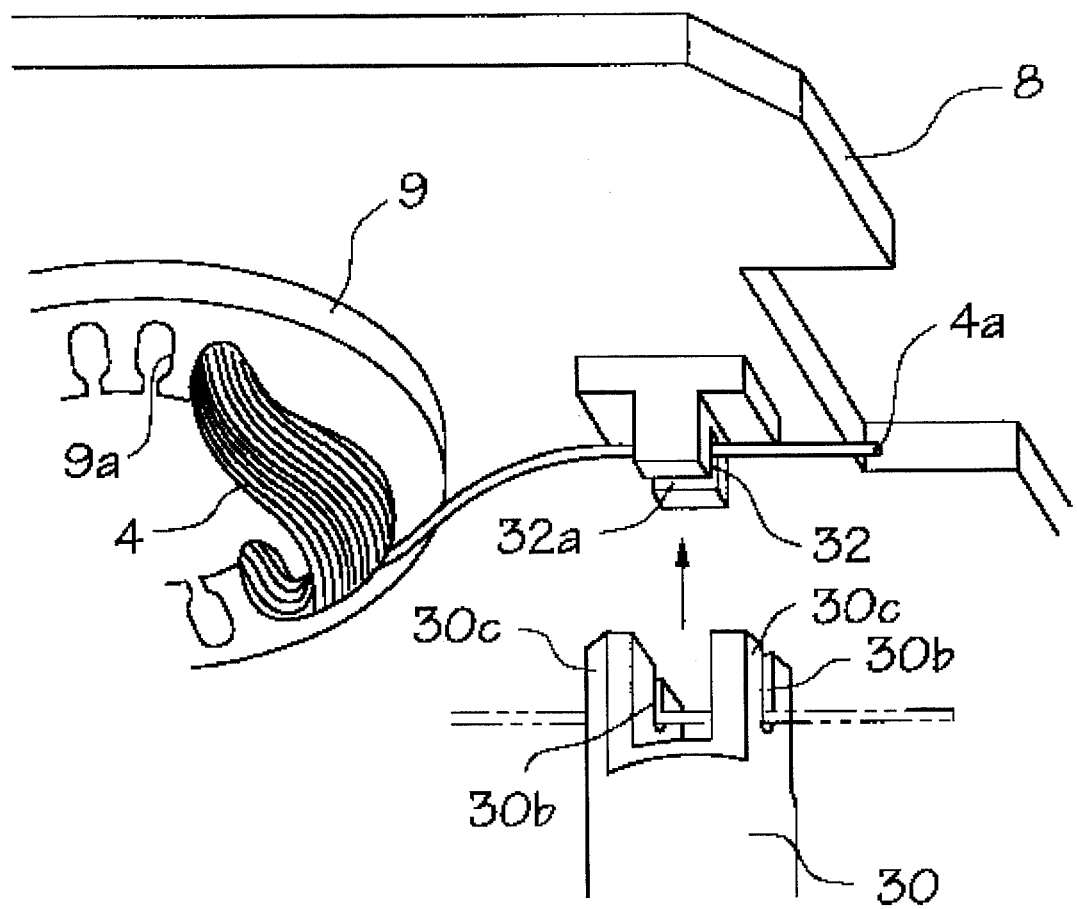
FIG. 8 is a perspective view showing the pallet side of the third embodiment viewed from diagonally downward.

FIG. 6 is a front elevational view showing the third preferred embodiment of the invention. FIG. 7 is a perspective view of the upper tool thereof viewed from diagonally upward. FIG. 8 is a perspective view of the pallet side of this embodiment viewed from diagonally downward. The parts which are identical to those in the first preferred embodiment have the same reference numbers, and their description has been omitted.

In the third embodiment, bushings 30a and 31a are mounted in the base plate 7b of the inserter upper tool 7. The first lead wire holders 30 and 31 are mounted in the bushings 30a and 31b so that they are slidable vertically but not rotatable. As shown in FIG. 6, tongue-like pieces 30c and 31c are provided with grooves 30b and 31b and are formed at the upper end portion of the lead wire holders 30 and 31. The remaining composition is similar to that of the first preferred embodiment as shown in FIGS. 1–3. The distance between the respective tongue-like pieces 30c and 31c of the first lead wire holders 30 and 31 is larger than that of the second lead wire holders 32 and 33 which are installed opposite to the first lead wire holders 30 and 31 on the lower surface of the pallet 8.

The upper tool is moved to the insertion station with the leading end and the trailing end, 4a and 4b, of the coils 4 in the upper tool 7 being held in the slits 30b and 31b of the first lead wire holders 30 and 31. The stator core 9 fixed on the pallet is then transferred above the inserter upper tool 7 and lowered onto the blades of the inserter upper tool 7. The first lead wire holders 30 and 31 holding the ends, 4a and 4b, are moved to insert the ends, 4a and 4b, into the slits 32a and 33a of the second lead wire holders 32 and 33 on the lower surface of the pallet 8. The first lead wire holders 30 and 31 then return to their original positions. The actuator which raises holders 30 and 31 may be the same as or linked to the actuator which raises the tool 7 into the stator. In this way, the movement of holders 30 and 31 is easily coordinated with insertion of the coils into the stator.

According to the third embodiment, it is possible to hold the leading end and the trailing end, 4a and 4b, directly in the second lead wire holders 32 and 33 on the pallet by elevating the first lead wire holders 30 and 31 on the upper tool 7, thereby eliminating the necessity of moving, turning, opening and closing. Thus, the structure of the apparatus becomes further simplified.

Furthermore, although not illustrated, if the first lead wire holders 30 and 31 shown in the third embodiment, are combined with the connecting terminals 20 and 21, which are provided at the stator core (or the widened area of the stator core) shown in the second embodiment, the total number of work steps decreases, and at the same time the structure thereof will be simplified ever further.

Still furthermore, in the first and second preferred embodiments, the first lead wire holders installed at the inserter upper tool 7 and the second lead wire holders installed at the pallet or the stator core, which correspond to the first lead wire holders, may be provided at any positions.

In order to simplify the motion of the second lead wire transfer means, they are typically provided at as corresponding facing positions as possible or as close to each other as possible.

As described above, a coil lead wire apparatus, according to the second embodiment of this invention, is provided with the first and second lead wire holders which can hold the start and the finish lead wires at both the upper tool and the pallet. At the same time it has a first lead wire transfer means which causes the first lead wire holders to hold the lead wires and a second lead wire transfer means which transfers the lead wire held by the first lead wire holders onto the second lead wire holders. The leading end and trailing end, 4a and 4b, which are inserted in the stator core are held at an appointed position on the pallet to which the stator core is attached. This facilitates the transfer thereof to subsequent processes.

Because the coil lead wire apparatus, according to the second embodiment, is composed so that the lead wire held at the lead wire holders 10 and 11 on the upper tool is connected directly to the connecting terminals 20 and 21 of the stator core by the second lead wire transfer means, the number work steps decreases, thereby, increasing productivity.

Still furthermore, when the coil lead wire apparatus, according to the second embodiment, has first lead wire holders which are flexible to extend in the direction of coil insertion on the upper tool and extend the first lead wire holders when inserting a coil, it is possible to transfer the ends of the wire onto the lead wire holders on the pallet without use of the second lead wire transfer means. This decreases the number of moving parts and, at the same time, simplifies the apparatus by making it more compact.

Still furthermore, when the coil lead wire apparatus is provided with flexible lead wire holders on the inserter upper tool which extend the lead wire holders, it is possible to connect the ends of the wires directly to the connecting terminals of the stator core, thereby causing the number of work processes to be further reduced and the structure thereof to be remarkably simplified.

While the invention has been illustrated in some detail according to the various embodiments shown in the accompanying drawings, one skilled in the art will appreciate that various modifications can be made to this invention without departing from the spirit and scope of the following claims.

What is claimed is:

1. An apparatus for handling and terminating wound coils during coil winding and insertion of the coil into a stator comprising:

a rotating flier;

a winding form about which the flier winds the coils by consecutive turns;

an inserter tool onto which the wound coils are stripped;

a pair of first lead wire holders on the inserter tool, one of said holders for holding the leading end and one of said holders for holding the trailing end of the lead wire forming the wound coils;

a first lead wire transfer means which grasps the wire on said form and transfers the wire to one of the first lead wire holders;

a second pair of lead wire holders on the stator or on a pallet supporting the stator at positions corresponding to those of the first pair of lead wire holders, one of the second lead wire holders for holding the leading end and one of the second lead wire holders for holding the trailing end of the lead wire forming the wound coils; and a second lead wire transfer means which transfers the lead wire held by the first pair of lead wire holders to the second pair of lead wire holders.

2. The apparatus of claim 1 wherein the second pair of lead wire holders are terminals mounted on the stator.

3. The apparatus of claim 1 wherein the second pair of lead wire holders are mounted on a pallet which supports the stator.

4. The apparatus of claim 1 wherein the winding form includes a single winding stage.

5. The apparatus of claim 1 wherein the winding form includes plural winding stages.

6. An apparatus for handling and terminating wound coils during coil winding and insertion of the coil into a stator comprising:

a rotating flier;

a winding form about which the flier winds wire by consecutive turns;

an insertion tool onto which the wound coils are stripped;

a pair of first lead wire holders on the inserter tool, one of said holders for holding the leading end and one of said holders for holding the trailing end of the lead wire forming the wound coils;

a first lead wire transfer means which grasps the wire on said form and transfers the leading end of the wire to one of the first lead wire holders; and second pair of lead wire holders on the stator, or on a pallet supporting the stator at positions corresponding to those of the first pair of lead wire holders, one of the second lead wire holders for holding the leading end and one of the second lead wire holders for holding the trailing end of the lead wire forming the wound coils; wherein the first pair of lead wire holders can be actuated such that they extend from a first position adjacent the inserter tool to a second position in which they engage the second pair of lead wire holders.

7. The apparatus of claim 6 wherein the first pair of lead wire holders are mounted in a bushing, such that the first pair of lead wire holders are movable with respect to the inserter tool and the first pair of lead wire holders include a means at the end thereof for grasping the lead wire.

8. The apparatus of claim 6 wherein the second pair of lead wire holders is mounted on a pallet which supports the stator.

9. The apparatus of claim 6 wherein the winding form includes a single winding stage.

10. The apparatus of claim 6 wherein the winding form includes plural winding stages.

11. An inserter tool comprising a plurality of blades extending longitudinally from a platform, the blades being spaced apart from one another so as to provide a plurality of guides between the adjacent blades, said blades and guides being arranged to receive a wound wire coil stripped from a winding form, and a pair of wire holders on the platform for holding the leading end and trailing end of the wire forming the coil, wherein the wire holders are capable of extending from a first position adjacent the platform to a second position removed from the platform.

12. The tool of claim 11 wherein the wire holders are mounted in a bushing and the wire holders include a means at the end thereof for grasping a wire.

13. A process for winding a coil and inserting a coil into a stator comprising the steps of:

grasping a leading end of wire with a first wire transfer means;

winding a coil on a winding form;

stripping the coil from the winding form onto an inserter tool;

inserting that leading end of wire in a wire holder on an inserter tool;

grasping a trailing end of the wire forming the coil with a wire transfer means;

inserting the trailing end in a second wire holder on the inserter tool;

inserting the coil into a stator; and transferring the leading and trailing ends of the wire forming the coil from the wire holders on the inserter tool to first and second wire holders on the stator or on a pallet supporting the stator.

14. The process of claim 13 wherein the step of transferring the leading and trailing ends of the wire forming the coil from the wire holders on the inserter tool comprises transferring leading and trailing wire ends to wire holders on a pallet supporting the stator.

15. The process of claim 13 wherein the step of transferring the leading and trailing ends of the wire from the wire holders on the inserter tool comprises extending the wire holders on the inserter tool from a first position adjacent the tool to a second position where the wire holders on the inserter tool engage the wire holders on the pallet or the stator.

16. The process of claim 13 wherein the step of transferring the leading and trailing ends from the wire holders on the inserter tool comprises grasping the wire in the wire holders on the inserter tool with a wire transfer means and transporting the wire ends on the wire transfer means to the wire holders on the pallet or the stator.

17. The process of claim 13 wherein the winding form includes a single winding stage.

18. The process of claim 13 wherein the winding form includes plural winding stages.

19. The process of claim 13 wherein the step of transferring the leading and trailing ends of wire forming the coil includes grasping the leading and trailing ends with a second wire transfer means and transporting the leading and trailing ends to the second pair of lead wire holders on the second wire transfer means.

* * * * *